Oct. 12, 1926.
W. M. ZORN
1,602,632
APPARATUS FOR MAKING COFFEE
Filed Oct. 15, 1919    3 Sheets-Sheet 1
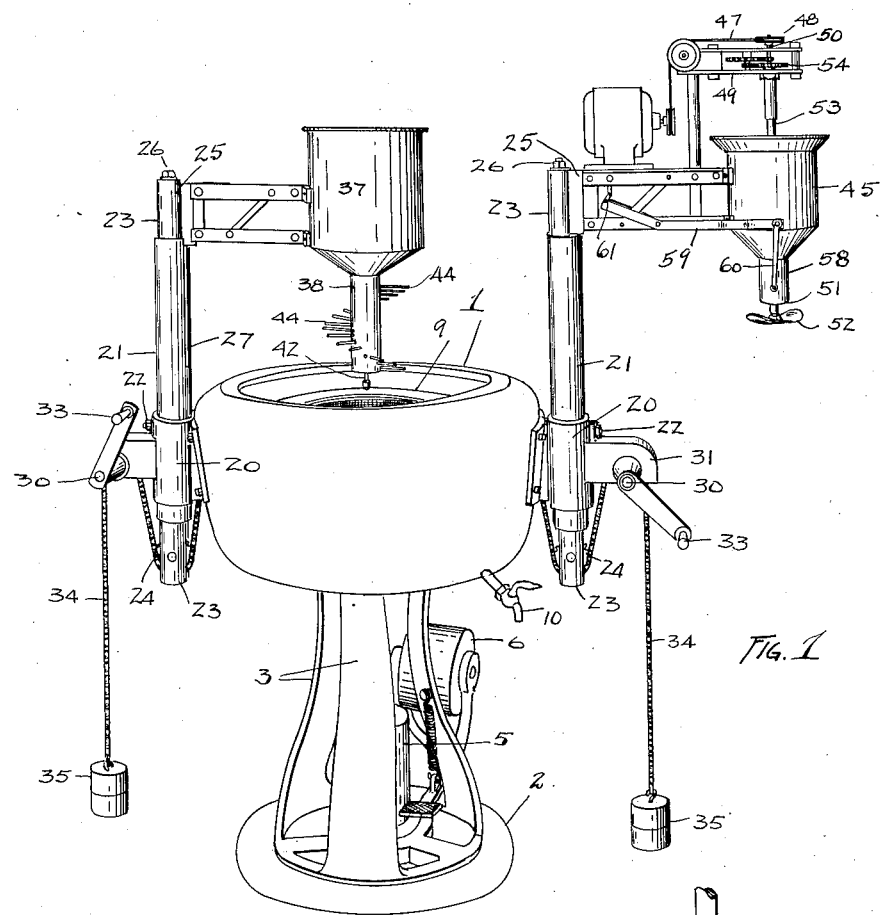
Fig. 1
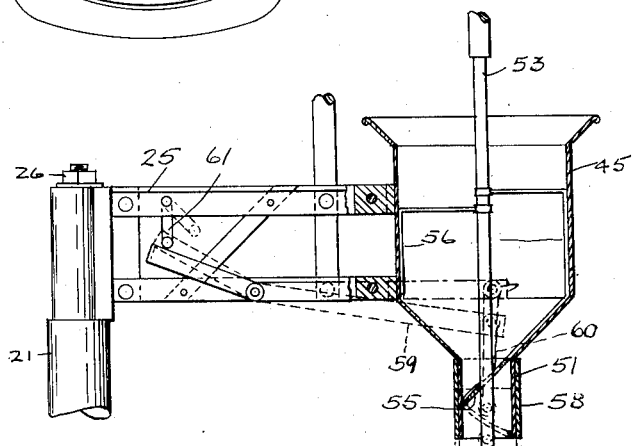
Fig. 3
INVENTOR
Walter M. Zorn
By Day, Oberlin & Day
ATTORNEYS.

Oct. 12, 1926.
W. M. ZORN
1,602,632
APPARATUS FOR MAKING COFFEE
Filed Oct. 15, 1919  3 Sheets-Sheet 2
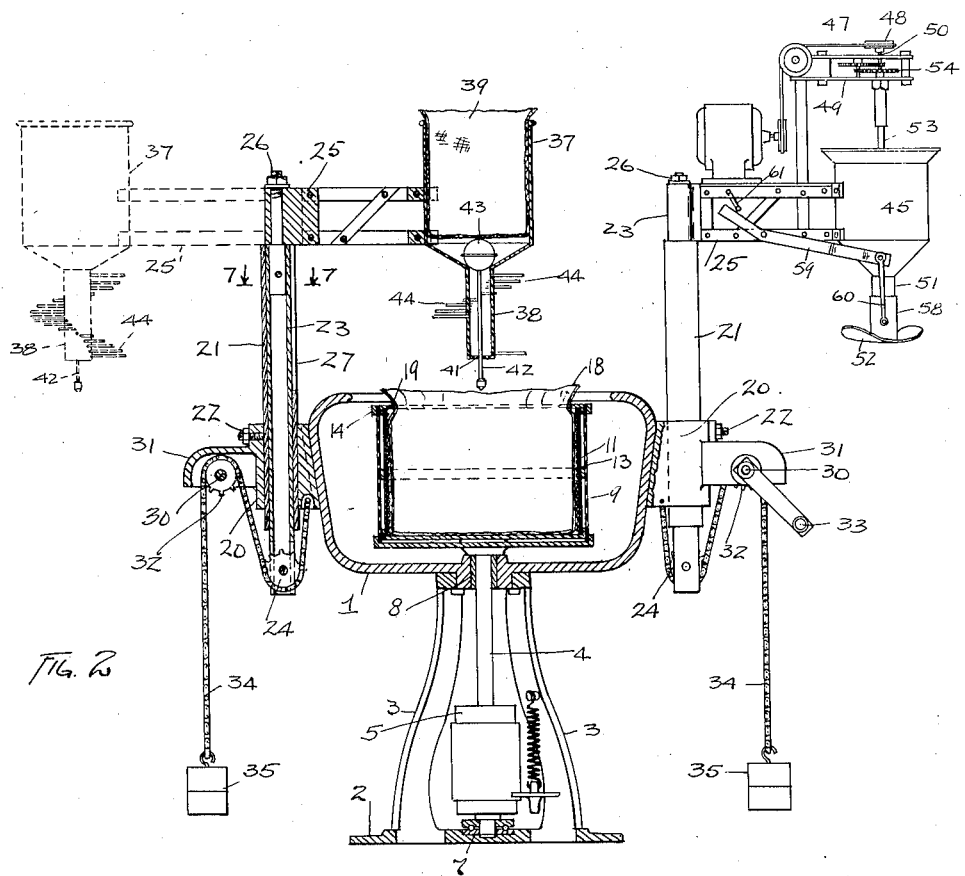
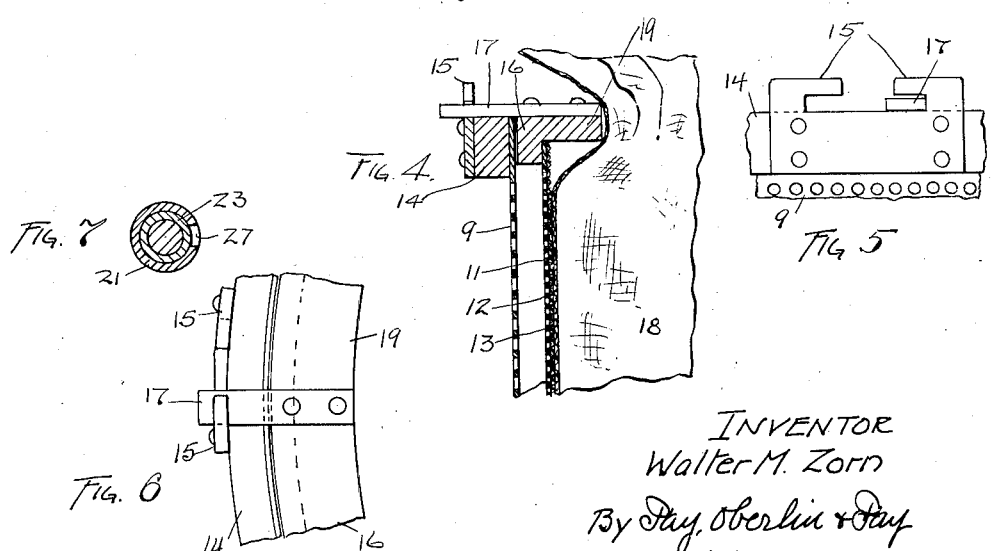
INVENTOR
Walter M. Zorn
By Day, Oberlin & Day
ATTORNEYS.

Oct. 12, 1926.

W. M. ZORN 1,602,632

APPARATUS FOR MAKING COFFEE

Filed Oct. 15, 1919    3 Sheets-Sheet 3

INVENTOR.
Walter M. Zorn
BY
Day, Oberlin & Day
ATTORNEYS

Patented Oct. 12, 1926.

1,602,632

UNITED STATES PATENT OFFICE.

WALTER M. ZORN, OF CLEVELAND, OHIO, ASSIGNOR TO THE MANTHEY-ZORN LABORATORIES COMPANY, OF CLEVELAND, OHIO, A CORPORATION OF OHIO.

APPARATUS FOR MAKING COFFEE.

Application filed October 15, 1919. Serial No. 330,847.

The present invention relates to a method of making coffee, as well as to suitable apparatus for carrying out the method. The present improved method provides a way of obtaining a greatly increased amount of the aromatic oils from the coffee, and at the same time withdrawing only a minimum of the acids and undesirable ingredients. In carrying out this method it has been found desirable to keep the coffee and the water in contact for only a very limited length of time, and the water and coffee should not be boiled together. The apparatus is designed to carry out the method in an efficient manner, and to enable large quantities of coffee to be made quickly and easily, and with very little labor.

The annexed drawings and the following description set forth in detail certain means and one mode of carrying out the invention, such disclosed means and mode illustrating, however, but one of various ways in which the principle of the invention may be used.

Figure 8:
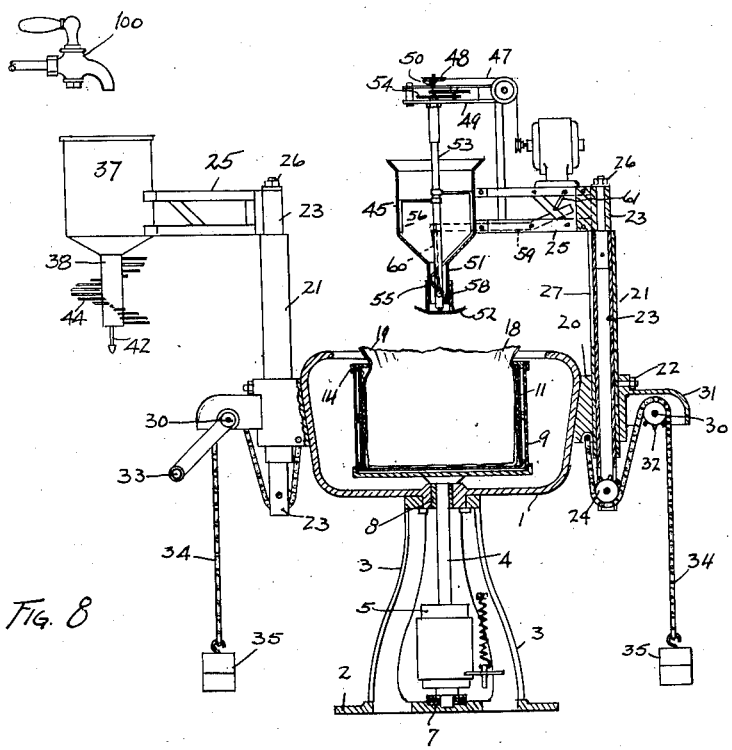
Figure 9:
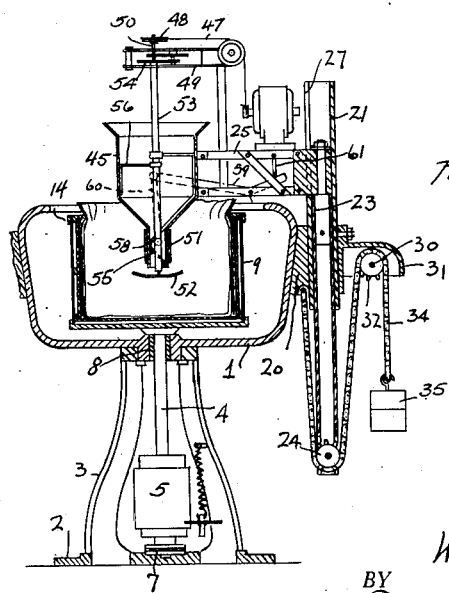

In said annexed drawings:

Fig. 1 is a perspective view of my improved apparatus; Fig. 2 is a central vertical section with parts shown in elevation; Fig. 3 is a section through the coffee distributing device; Fig. 4 is a broken vertical section showing container and filter bag; Fig. 5 is a detail of drive for the inner container; Fig. 6 is a plan view of the drive; and Fig. 7 is a section on the line 7—7, Fig. 2; Fig. 8 is a central vertical section showing the coffee distributing mechanism in position over the vat; and Fig. 9 is a similar section but showing the coffee hopper lowered into distributing position.

In the present method I have provided means for forming a thin cylindrical wall of finely ground coffee, or what I prefer to term coffee flour. By rotating this wall at high speed, and at the same time distributing or spraying water over the surface of the same, the centrifugal action forces the water through the coffee, extracting the aromatic oils and forming a fluid coffee which is very strong. The water should be practically at the boiling point, and only a very limited quantity of water is employed.

It has been found that the wall of coffee flour should be held against a foraminous outer wall, the holes or apertures of which should be relatively small and evenly spaced so that the water may be evenly forced through the coffee throughout its entire area, and not concentrated at spots as would be the case if a fewer number of large openings were employed in the container.

One satisfactory way of accomplishing this result is to use a foraminous container in which is mounted a bucket made of heavy filter cloth or paper, so that the water is not only drawn uniformly through the coffee, but is filtered at the same time, thus giving a clear resultant liquid.

In the drawings I have shown one form of apparatus for carrying out the foregoing method of making coffee. This apparatus consists of a vat 1 mounted on a suitable base 2 having legs 3, within which is mounted a vertical shaft 4 provided with a pulley wheel 5, there being also a movable pulley wheel 6 adapted to be forced into engagement with the belt so as to keep the drive for the shaft tight at all times. The shaft is held in suitable bearings 7 and 8 in the base and in the bottom of the vat, and carries a perforated container 9 which is secured to the shaft and adapted to rotate therewith within the vat. The vat is also provided at one point with a suitable spigot or faucet 10 so that the liquid may be withdrawn from the vat as desired.

Within the perforated container is removably mounted a second foraminous container 11 which is shown as made up of a perforated outside wall 12 in which is mounted a screen 13 so as to form a foraminous container, the walls of which are porous, having the small apertures or holes evenly distributed over the entire surface for the purpose later to be described. The outer container is provided at its top with an encircling band or flange 14 having a series of locking lugs 15 attached thereto, and the inner container is also provided with an upper flange or ring 16, having short bars 17 adapted to engage under the lugs 15 on the outer container to hold the same securely together, so that the inner foraminous container will be rotated with the outer container by means of the shaft.

Within the foraminous container is mounted a filter bucket 18 which fits snugly adjacent the inner wall of the container, and this bucket is formed of either closely woven heavy cloth, or heavy filter paper, or like material. These buckets are removable, and are sufficiently stiff to be forced in place against the wall of the container and to maintain themselves in that position. As shown the upper ring of the inner container extends inwardly so that the bucket is curved around and over this ring, which helps to maintain it in position in the container. This inwardly extending portion 19 also prevents the water and coffee flour from being thrown out at the top of the container.

At each side of the vat there is a suitable apertured boss 20 in which is mounted a hollow tube 21 which is secured in place by means of a set-screw 22 or the like, and slidably mounted within this tube is a second tube or shaft 23 which has a sprocket 24 rotatably mounted in its lower end. At its upper end the shaft is encircled by an arm or frame-work 25 which is held in place on the same by means of a nut 26 threaded onto the end of the shaft. The outer tube is provided with a vertical slot 27 cut in a plane which passes radially through the vat, and the arm is adapted in one position to be received in this slot, so that the arm and inner tube may be moved downwardly within the outer tube. When pulled up into the position shown in Fig. 2, by revolving the arm slightly it rests upon the top of the outer tube and is held in position above the vat and containers. To move these inner tubes and arms the boss is provided with a shaft 30 carried in a covered extension 31, there being a gear 32 mounted on this shaft which is adapted to be rotated by means of a handle 33, and a chain 34 is secured to the lower side of the boss and then engages under the gear 24 on the tube and over the gear on the shaft and then extends downwardly where it is provided with a counter-weight 35. In this way, by moving the arm into alignment with the slot, and then turning the handle, the tube and arm may be moved up and down within the fixed tube.

As shown in Figs. 1 and 2, the arm at the left of the vat is provided with a suitable hopper 37, having a cylindrical outlet tube 38, this hopper being adapted to receive the boiling water from a suitable faucet 100, and, as shown, it is provided with a cloth filter bucket 39 which is removably mounted within the hopper. The outlet tube 38 is provided with a small aperture 41 in the lower end, through which is mounted a rod 42 carrying a ball valve 43 at its top which is adapted to rest on the upper end of the tube and thus prevent the water from flowing into the tube when the hopper is in the position shown in Fig. 2. When the hopper is lowered into the container this rod 42 is adapted to contact the bottom of the container or filter bucket, and thus force the ball valve upwardly, allowing the water to flow into the outlet tube. This outlet tube is provided around its circumference with a series of small radially extending tubes 44, the tubes being of equal length, but being formed in a spiral about the outlet tube proper. When the valve is open the water is thus sprayed or distributed from these small tubes out against the wall of the filter bucket, and uniformly over this wall as the bucket and containers are rotated.

On the other arm, at the right of the vat as shown in Fig. 2, is mounted a second hopper 45, the details of which are best shown in Fig. 3. This hopper is adapted to receive the ground coffee or flour. Mounted upon the arm is a small motor which is connected by means of a belt 47 and pulley wheels 48 which are carried on a bracket 49 mounted on the arm, to a shaft 50 which extends centrally through the hopper, and which is provided at its lower end below the cylindrical outlet tube 51 of the hopper with a screw or propeller 52. Surrounding this shaft is a tube 53 driven from the shaft by means of gearing 54 and provided with a feed screw 55 within the outlet tube and with scrapers 56 fitting closely adjacent the sides of the hopper and which move the coffee flour toward the bottom of the hopper. The shaft 50 is driven at high speed from the motor while the tube 53 revolves slowly, the gearing furnishing the necessary reduction. This hopper is generally cylindrical in form, and is provided with a cone-shaped lower end, ending in the outlet tube 51 around which is mounted a second tube 58 adapted to have vertical movement, and this tube in its lower position rests upon the propeller so as to prevent the flour from falling through the tube. Pivotally mounted on the frame is an arm 59 which is connected by a link 60 to this outer tube, and the tube is normally adapted to remain in its lower or closing position, but may be moved upwardly (as shown in Figs. 2 and 3) by means of a cam member 61 pivotally attached to the frame work and engaging with the outer end of the pivoted arm 59.

The coffee is first placed in this hopper 45, and the hopper is then turned over the vat and lowered into the container. The motor and lowered into the container is then started, and the outlet tube is raised from the normal closed position shown in dotted lines in Fig. 3, so that the coffee flour falls through the tube onto the propeller and is thrown evenly against the interior wall of the filter bucket, where it sticks, thus forming a thin cylindrical wall of coffee on the interior of the filter bucket. The hopper is then removed from the container, and the water hopper is then revolved over the vat and lowered into the same until the valve is open, so that the water in the hopper is distributed evenly against the cylindrical wall of coffee. It is to be understood that during the forming of the cylindrical wall of coffee, and during the distribution of the water, the containers and filter bucket are continuously rotated at high speed. This rotation of the filter bucket helps to maintain the cylindrical wall in position, and the centrifugal force is sufficient to force the water through the wall of coffee, the filter bucket and the foraminous container, and out through the wall of the perforated container into the vat, from which it is drawn off by means of the spigot.

In the form of apparatus here shown, the coffee hopper is of a size sufficient to receive approximately two pounds of coffee which form on the filter bucket a thin cylindrical wall of coffee and to obtain the best results in a machine of the present size the wall should be approximately three-eighths of an inch in thickness, but this may be varied within quite wide limits depending on the size of machine and the conditions of use. The water hopper is adapted to contain approximately a gallon of water. The outlet tubes of the water hopper are adapted to distribute this water against the wall of coffee during a very short period, the arrangement as shown being adapted to distribute the gallon of water within approximately twenty to twenty-five seconds, and the entire operation, from the time the water begins to flow against the wall of coffee until it is entirely forced through the containers into the vat, should not exceed about a minute and a half for this size of apparatus under the conditions described. I have shown a suitable hot water spigot mounted over the water hopper in its position away from the vat, and the water is adapted to be boiling hot when run into the hopper, and is then to be used immediately.

In the present operation the water is maintained in contact with the coffee flour for only a very short length of time, but is evenly distributed over the entire area of the wall of coffee, and the centrifugal force is sufficient to force the water evenly through the wall of coffee to extract the aromatic oils, but as the water is not actually boiling, and as the time of contact is short, the water only extracts a very small percentage of the tannin and the bitter acids of the coffee, so that the resultant coffee liquid, which containing the aromatic oils, does not contain enough of the bitter acids and tannin to make the resultant liquid bitter.

The liquid obtained by using approximately a gallon of water to two pounds of coffee is enormously stronger than coffee as it is usually made, and before using must, of course, be diluted from six to ten times. By using the present apparatus, it has been found possible, with the same coffee as would be used in an urn, to approximately double the number of cups of coffee obtained from a pound of flour of the same cup quality. Heretofore, in the best urns it has been found possible to obtained only about forty to fifty cups of coffee to the pound of ground coffee or coffee flour used, while by the present apparatus I am able to obtain from eighty to slightly more than one hundred cups of coffee of the same relative strength per pound of coffee flour.

This reduces the cost per cup of coffee materially, and coffee made by the present appartus has the added advantage that the bitter elements in the resultant coffee are reduced to a minimum, and thus the amount of cream and sugar used per cup of coffee may also be materially reduced. Cream and sugar are ordinarily used in coffee to make what is termed a smooth drink, but this smoothness is in reality merely the neutralizing of the bitter components of the coffee, and, as in the present coffee, these bitter components are practically eliminated, the necessity for using cream and sugar is reduced, and the actual amounts of both cream and sugar necessary per cup of coffee to produce the usual flavor are approximately cut in half.

By using the present method of making coffee, which consists in forcing through a relatively thin wall of coffee flour boiling hot water, in a very short length of time, that is a length of time short enough so that the acids and bitter components are not removed from the coffee, I have found it possible not only to increase the number of cups per pound of coffee used, but also to decrease the amounts of cream and sugar necessary which presents a very large saving to the big users of coffee, such as restaurants and the like.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In apparatus for making coffee, the combination with a vat, a perforated container rotatably mounted in said vat, a cylindrical foraminous container adapted to fit within said perforated container and revolve therewith, means mounted on said vat for forming a cylindrical wall of coffee flour on the interior of said foraminous container, other means mounted on said vat for spraying water against such wall of coffee flour, and power means for rotating said container.

2. In apparatus for making coffee, the combination with a vat, a perforated container rotatably mounted in said vat, a cylindrical foraminous container adapted to fit within said perforated container, means for locking said foraminous container to said perforated container so as to revolve together, means movably mounted on said vat and adapted to be moved into said container to form a cylindrical wall of coffee flour on the interior wall of said foraminous container, other means movably mounted on said vat and adapted to distribute water against such wall of coffee during rotation, and power means for rotating said perforated container.

3. In apparatus for making coffee, the combination with a vat, a perforated container rotatably mounted in said vat, a cylindical foraminous container adapted to fit within said perforated container, means for locking said foraminous container to said perforated container so as to revolve together, a filter bucket mounted interiorly of said foraminous container and adjacent thereto, means movably mounted on said vat and adapted to be moved into said container to distribute coffee flour to form a cylindrical wall thereof on said filter bucket, other means movably mounted on said vat and adapted to be moved into said container and adapted to distribute water uniformly over such cylindrical wall of coffee during rotation, and power means for rotating said containers and filter bucket.

4. In apparatus for making coffee, the combination with a vat, a perforated container rotatably mounted in said vat, a cylindrical foraminous container adapted to fit within said perforated container, means for locking said foraminous container to said perforated container so as to revolve together, a filter bucket mounted interiorly of said foraminous container and adjacent thereto, and a coffee flour hopper movably attached to said vat and adapted to be moved into said container and filter bucket, distributing means on said hopper for throwing such coffee flour against said filter bucket to form a cylindrical wall of coffee on the interior of said bucket, means for distributing water against such wall of coffee during rotation, and means for rotating said containers and filter bucket.

5. In apparatus for making coffee, the combination with a vat, a perforated container rotatably mounted in said vat, a cylindrical foraminous container adapted to fit within said perforated container, means for locking said foraminous container to said perforated container so as to revolve together, a filter bucket mounted interiorly of said foraminous container and adjacent thereto, means movably mounted on said vat and adapted to be moved into said container to distribute coffee flour to form a cylindrical wall thereof on said filter bucket, a water hopper movably mounted on said vat and adapted to be moved into said containers and filter bucket to distribute water uniformly over such cylindrical wall of coffee during rotation, and power means for rotating said containers and filter bucket.

6. In apparatus for making coffee, the combination with a vat, a perforated container rotatably mounted in said vat, a cylindrical foraminous container adapted to fit within said perforated container, means for locking said foraminous container to said perforated container so as to revolve together, a filter bucket mounted interiorly of said foraminous container and adjacent thereto, a coffee flour hopper movably attached to said vat and adapted to be moved into said container and filter bucket, distributing means on said hopper for throwing such coffee flour against said filter bucket to form a cylindrical wall of coffee on the interior of said bucket, a water hopper movably mounted on said vat and adapted to be moved into said containers and filter bucket to distribute water uniformly over such cylindrical wall of coffee during rotation, and power means for rotating said containers and filter bucket.

7. In apparatus for forming a cylindrical wall of coffee, the combination of a rotatably monuted container, a coffee hopper movably mounted adjacent said container, and adapted to be moved into said container, and means carried by said coffee hopper and adapted to distribute the coffee from said hopper over the interior wall of said container during rotation of said container.

8. In apparatus for forming a cylindrical wall of coffee, the combination of a vat, a foraminous container rotatably mounted therein, and means for rotating said container, a coffee hopper movably mounted on said vat and adapted to be moved into said container, and distributing mechanism carried by said hopper and adapted to distribute coffee evenly over the interior wall of said container during its rotation.

9. In a centrifugal infusing machine, the combination of a suitable vat, a foraminous cylindrical container rotatably mounted therein, and means for rotating said container, a distributing device movably mounted on said vat and adapted to be moved into said container to distribute ground material to be infused against the wall of said foraminous container, and a liquid discharge device movably mounted on said vat and adapted to be moved into said container, said liquid discharge device being adapted to distribute the liquid evenly against the ground material on said container wall.

10. In a centrifugal infusing machine, the combination of a base, a vat for collecting the resultant infused liquid mounted thereon, a foraminous container rotatably mounted in said vat, means for rotating said container, two arms mounted on said vat, a distributing device for the material to be infused movably and adjustably mounted on one of said arms and adapted to be moved into said container, means on said arm and adapted to actuate said distributing device to spread such material to be infused over the interior wall of said container, and a liquid distributing device mounted on said other arm and adapted to be moved into said container, such liquid distributing device being adapted to automatically distribute the infusing liquid evenly against the material on said container wall upon being moved into operative position in said container.

Signed by me, this 14 day of October, 1919.

WALTER M. ZORN.